United States Patent [19]

Nakano et al.

[11] Patent Number: 5,319,414
[45] Date of Patent: Jun. 7, 1994

[54] RANGEFINDER FOR CAMERAS

[75] Inventors: Toshifumi Nakano; Kazuhiro Satoh, both of Sagamihara, Japan

[73] Assignee: Olympus Optical Co., Ltd., Tokyo, Japan

[21] Appl. No.: 25,930

[22] Filed: Mar. 3, 1993

[30] Foreign Application Priority Data

Mar. 5, 1992 [JP] Japan ............................. 4-011179[U]

[51] Int. Cl.$^5$ ........................ G03B 13/36; G01C 3/08
[52] U.S. Cl. ........................................ 354/403; 356/1
[58] Field of Search ................. 354/403; 356/1, 4; 250/201.4, 201.6

[56] References Cited

U.S. PATENT DOCUMENTS 4,748,469  5/1988  Tamura ........................ 354/403

*Primary Examiner*—W. B. Perkey
*Attorney, Agent, or Firm*—Louis Weinstein

[57] ABSTRACT

A multipoint rangefinder employs a light-emission device including a package which has a plurality of light-emission elements contained therein and mounting terminals extending therefrom, the light-emission elements being arranged in a line crossing a dimension along which mounting terminals extend. If, in mounting the rangefinder in a camera, the light-emission elements are arranged obliquely, the dimension along which the mounting terminals extend is made to coincide, for example, with the horizontal dimension. This arrangement provides various remarkable advantages. For example, it helps to avoid a substantial increase in the height of the camera housing and attain an improvement in the compactness with which the camera components are mounted, thus proving effective in camera miniaturization.

14 Claims, 7 Drawing Sheets

FIG. 5
(RELATED ART)
FIG. 6
(RELATED ART)
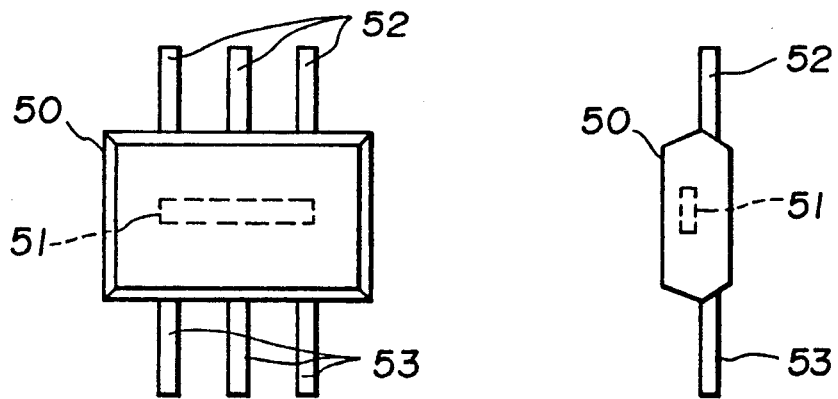
FIG. 7
(RELATED ART)
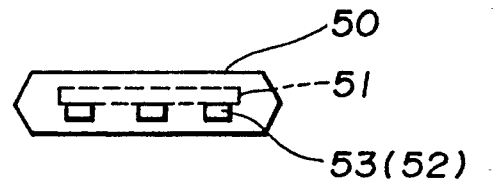

FIG. 8
(RELATED ART)
FIG. 9
(RELATED ART)
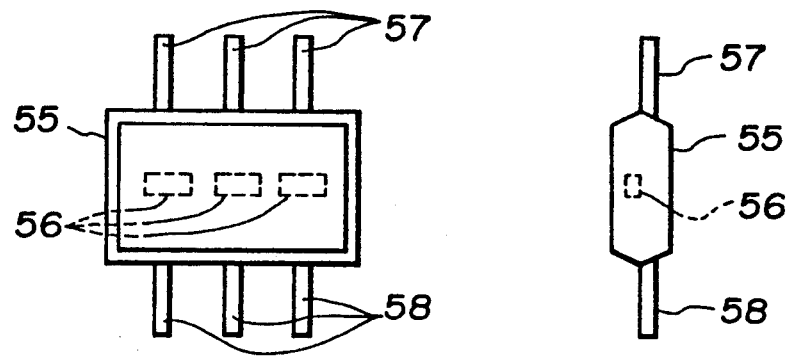
FIG. 10
(RELATED ART)
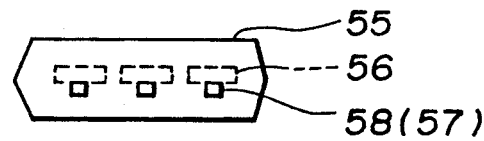
FIG. 11
(RELATED ART)
FIG. 12
(RELATED ART)
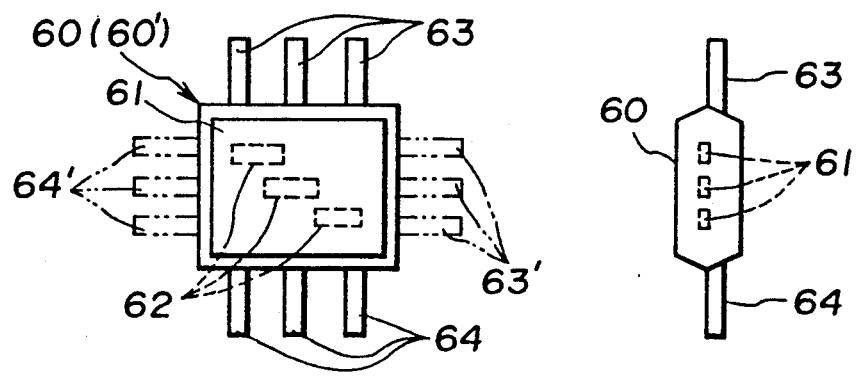
FIG. 13
(RELATED ART)
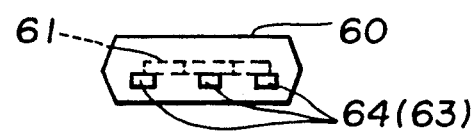

RANGEFINDER FOR CAMERAS

BACKGROUND OF THE INVENTION

1. Field of the Invention

This invention relates to a rangefinder for cameras and, more specifically, to an arrangement of the mounting terminals and light-emission elements of a light-emission-element package constituting a light-emission block in a light-emission-type multipoint rangefinder.

2. Related Art Statement

Conventionally, in a so-called multipoint automatic focusing device for performing range finding on a plurality of points of the type whose light-emitting and light-receiving sections are arranged horizontally with respect to the front side of an associated camera, a plurality of LED elements constituting the light-emission device have generally been arranged horizontally on the light-emission side, and, on the light-reception side, a plurality of PSD elements constituting the light-reception device have likewise been arranged horizontally, in order to avoid a so-called middle clearing.

FIGS. 5, 6 and 7 are a front view, a side view and a bottom view, respectively, of a conventional light-reception PSD package of a unitary type, in which a PSD element 51 is arranged in a package 50 and, further, mounting terminals 52 and 53 are arranged above and below the PSD element. When the light-reception device is thus formed by a single PSD element, the device has a large noise component, resulting in a low accuracy in range finding. FIGS. 8, 9 and 10 are a front view, a side view and a bottom view, respectively, of another conventional light-reception PSD package, in which a number of light-reception PSD elements 56 corresponding to the number of points in range finding (three in this case) are arranged so as to allow range finding to be performed from short to long distances. With this arrangement, the accuracy in range finding can be improved, each light-reception element functioning as an independent one. In the drawings, reference numerals 57 and 58 indicate mounting terminals. However, when, as in the case of FIG. 8, the PSD device consists of a number of PSD elements, the light-receiving package 55 has a larger lateral dimension as compared to the case of FIG. 5. This obviously constitutes a commensurate barrier to reducing the camera size.

Further, when, as in the case of FIG. 8, the PSD device consists of a number of PSD elements, the centers of the PSD elements are spaced apart from each other by a larger distance, which inevitably makes it necessary for the light-emission angle of the beam on the light-emission side to be very large. For example, when the PSD device shown in FIG. 8 is used in a compact camera with a zoomer (f 110 mm ~ f 38 mm), the light-emission angle must naturally be large, so that, although the light-emission beam can be held within the finder field in the case of a short focus (f 38 mm), it cannot be held within the finder field in the case of a long focus (f 110 mm).

In view of this, an oblique arrangement of PSD elements as shown, for example, in FIG. 11, has been proposed. FIGS. 11, 12 and 13 are a front view, a side view and a bottom view, respectively, of the outer configuration of a PSD package 60, in which three light-reception elements 62 are arranged obliquely with respect to a package 61. In the drawings, numerals 63 and 64 indicate mounting terminals. With this PSD device 60, constructed as described above, it is possible to miniaturize the package 61. However, the oblique arrangement of the PSD elements 62 naturally makes it necessary for the light-emission LED elements also to be arranged obliquely.

FIGS. 14A and 14B are perspective views showing an arrangement of the components of the range finding section of a multipoint rangefinder and respectively using such light-emission LED and light-reception PSD devices as described above. FIGS. 15A and 15B show a front view of the arrangement shown FIGS. 14A and 14B respectively. Referring to the drawings, in a light-emission LED device 65, three LED elements 67 are arranged laterally side by side inside a package 66, with mounting terminals 68 and 69 extending perpendicular to the dimension along which the three LED elements 67 are arranged. As for the light-reception device, which is the same as the light-reception PSD device 60 of FIG. 11, the package 61 itself is arranged in an erect position as shown in FIGS. 14A and 15A, so that the three light-reception elements 62 are arranged obliquely. Thus, with the LED device 65, it is necessary to arrange its package 66 in a tilted position with respect to an axis J (FIG. 15A) connecting it with the PSD device 60, and the three LED elements 67 are obliquely positioned as shown in FIG. 15A. As shown in FIGS. 14A and 15A and 14B and 15B, a light-emission lens 70 and a light-reception lens 71 are respectively arranged in front of the LED device 65 and PSD device 60, respectively.

FIG. 16 is a front view of a camera in which the light-emission LED elements are arranged perpendicular to the dimension along which the mounting terminals extend. As shown in the drawing, a lens frame unit 91 and a zoom driving unit 87 are arranged in the central section of the camera body, and, in the upper section of the camera body, a finder unit 88 and an electronic flash unit 89 are arranged. A body unit 90 is arranged in the camera section on the right hand side. The light-emission LED device 65 and the light-reception photo detector 92, which constitute the multipoint rangefinder, are mounted on a mounting substrate 93, and arranged longitudinally on the left-hand side of the lens frame unit 91. In the drawing, dimension X4 indicates the base length of the multipoint rangefinder, and dimension X7 indicates the height of the camera equipped with this multipoint rangefinder.

When, in the arrangement shown in FIGS. 14A and 15A, the elements 67 of the light-emission LED device 65 are arranged perpendicular to or along the same dimension as the mounting terminals 68 and 69, the vertical dimension X0 of the mounting terminals 68 and 69 is rather large, with the result that a reduction of the vertical dimension of the camera housing is considerably restricted, thus constituting a barrier to a reduction in camera size. Further, when actually mounting the LED device 65 in a camera, the LED device is attached to a mounting substrate 80a, as shown in FIG. 17, before it is installed in the camera. As a result, the diagonal dimension X2 of the mounting substrate 80a is the vertical dimension it actually occupies in the camera. Thus, it obviously further restricts a reduction in terms of camera size.

FIG. 18 is a front view of a camera with its front housing section removed, showing the LED device 65 as provided therein together with other components. In this case, the LED device 65 is installed in the camera together with a PSD device 60' installed in the same way as shown in FIG. 14B, except that the mounting terminals of the PSD device 60' extend along a dimension different from that of the light-reception PSD device 60. Before being installed in the camera, the light-emission LED device 65 is attached to the mounting substrate 80a in the manner shown in FIG. 17 and, in this condition, mounted in the section "a" of the camera. The light-reception PSD device 60' is attached to a mounting substrate 80b and mounted in the section "b" of the camera. The mounting terminals 63' and 64' of the light-reception PSD device 60' extend laterally as indicated by the broken lines in FIG. 11. In the central section of the camera, a lens frame unit 82 and a zoom driving unit 83 are arranged, and, in the upper section of the camera, a finder unit 84 and an electronic flash unit 85 are arranged. These components are supported by the camera body 86. In this conventional camera, constructed as described above, the dimension X4 of the height of the camera housing 81 is rather great because of the unutilized space due to the diagonal dimension X2 of the mounting substrate 80a of the LED device 65.

Also, in the construction shown in FIG. 16, the height X7 of the camera is rather great due to the extending terminals of the light-emission package 65.

OBJECT AND SUMMARY OF THE INVENTION

It is an object of this invention to provide a rangefinder in which the arrangement of the elements and mounting terminals of the light-emission-element-device package constituting the light-emission block is improved in such a way that when the range finder is installed in a camera, the dimension along which the mounting terminals extend can be appropriately adapted to the vertical or the lateral dimension of the camera, thereby making it possible to reduce the dimensions of the space the rangefinder occupies inside the camera, facilitating camera miniaturization.

In accordance with this invention, there is provided a camera rangefinder including a light-emission block which contains a plurality of light-emission elements and a light-reception block which contains position detecting elements, wherein mounting terminals are arranged to extend from the light-emission block and in parallel with the dimension of the base length of the camera, with the plurality of light-emission elements being arranged in a line crossing the dimension along which the mounting terminals extend. Further, the mounting terminals, extending from the light-reception block, extend in parallel with the dimension of the base length of the camera, and the dimension in which these mounting terminals extend is made to coincide with a detection axis of the position detecting elements.

Other features and advantages of this invention will become sufficiently apparent from the following description.

BRIEF DESCRIPTION OF THE DRAWINGS

FIG. 5 is a front view of a light-reception-element package of a conventional multipoint rangefinder using a unitary-type PSD device;

FIG. 6 is a side view of the light-reception-element package of FIG. 5;

FIG. 7 is a bottom view of the light-reception-element package of FIG. 5;

FIG. 8 is a front view of a light-reception-element package of a conventional multipoint rangefinder using a triple PSD device;

FIG. 9 is a side view of the light-reception-element package of FIG. 8;

FIG. 10 is a bottom view of the light-reception-element package of FIG. 8;

FIG. 11 is a front view of a light-reception-element package of a conventional multipoint rangefinder using a triple PSD device whose elements are obliquely arranged;

FIG. 12 is a side view of the light-reception-element package of FIG. 11;

FIG. 13 is a bottom view of the light-reception-element package of FIG. 11;

DETAILED DESCRIPTION OF THE PREFERRED EMBODIMENTS

Figure 1:
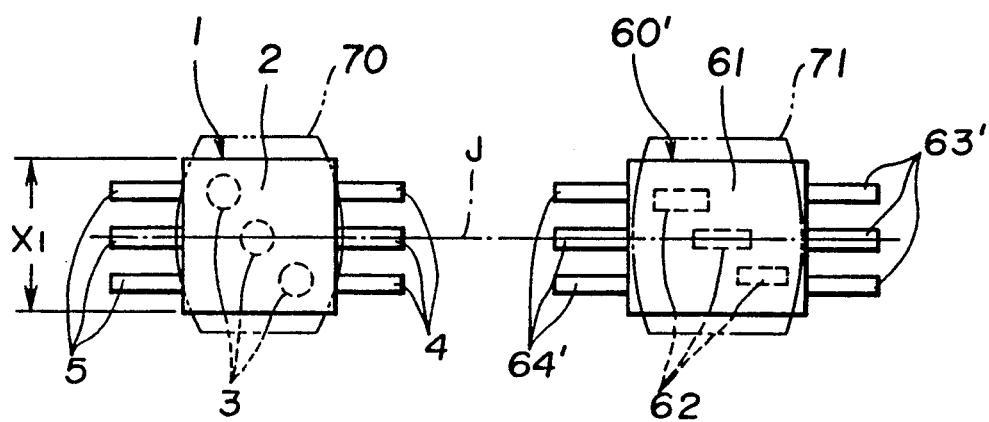
FIG. 1 is a front view showing how a light-emission-element package and a light-reception-element package are arranged in a multipoint range finder according to a first embodiment of the present invention.

Embodiments of the present invention will now be described with reference to the drawings.

A multipoint rangefinder according to a first embodiment of this invention will be described with reference to FIGS. 1 through 3, in which the components that are the same as those of the constructions described with reference to the above conventional examples are indicated by the same reference numerals.

FIG. 1 is a front view showing how the multipoint range finder of this embodiment is mounted in a camera, the multipoint rangefinder comprising: a light-emission LED device 1 containing a plurality of light-emission elements, and a light-reception PSD device 60' containing a plurality of light-reception elements. A light-emission lens 70 and a light-reception lens 71 are respectively arranged in front of the light-emission LED device 1 and the light-reception PSD device 60'. As shown in FIG. 1, the light-emission LED device 1 includes a package 2 containing three LED elements 3, which are arranged obliquely. Further, mounting terminals 4 and 5 are provided on the package 2 in such a way as to extend along a dimension crossing the line along which the LED elements 3 are arranged. As in the example shown in FIG. 11, the light-reception PSD device 60' includes a package 61 containing PSD elements 62 which are arranged obliquely. Mounting terminals 63' and 64' of the PSD device 60' extend laterally. When the rangefinder is mounted in the camera, the mounting terminals 4, 5, 63' and 64' extend in parallel with an axis J connecting the light-emission emission LED device 1 with the light-reception PSD device 60'.

Figure 15A:
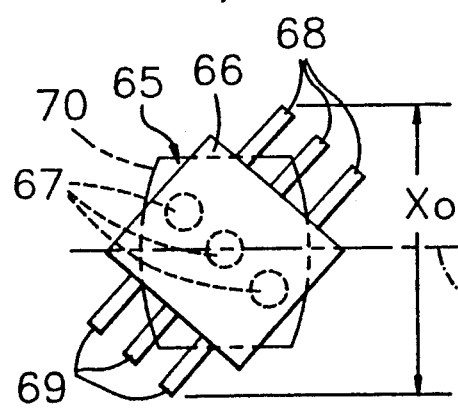
FIGS. 15A and 15B show front views of the respective package arrangements of the multipoint range finder shown in FIGS. 14A and 14B.
Figure 15B:
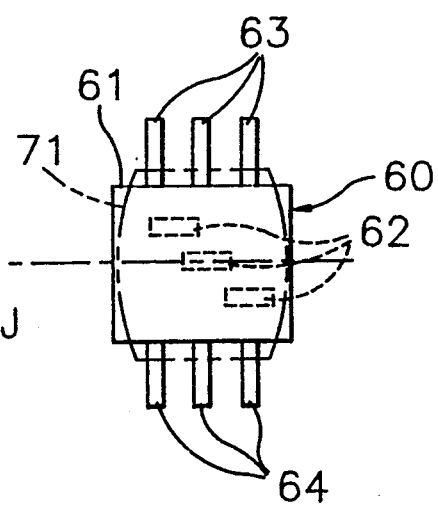
Figure 17:
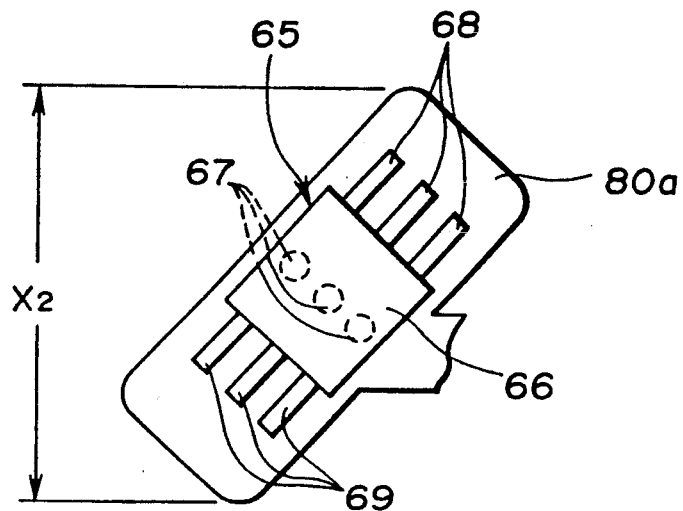
FIG. 17 is a diagram showing the light-emission device of the multipoint rangefinder of FIG. 14A as attached to a mounting substrate.

As shown in FIG. 1, the light-emission LED device 1 is attached to a mounting substrate 10a and, in this condition, mounted in the camera. Since the mounting terminals 4 and 5 extend horizontally as shown in FIG. 2, the vertical dimension the light-emission LED device 1 occupies in the camera is given by the width X3 (see FIG. 2), or the vertical dimension, of the mounting substrate 10a, which width is relatively small. The width X3 is considerably smaller than the height X2 of the conventional mounting substrate 80a shown in FIG. 17. The difference between these dimensions X3 and X2 is larger than the difference between the height X1 of the LED device 1 itself (see FIG. 1) and the height (oblique dimension) X0 as measured from tip to tip of the mounting terminals of the conventional LED device 65 (see FIG. 15A). Thus, the arrangement of this embodiment proves effective in camera miniaturization.

Figure 2:
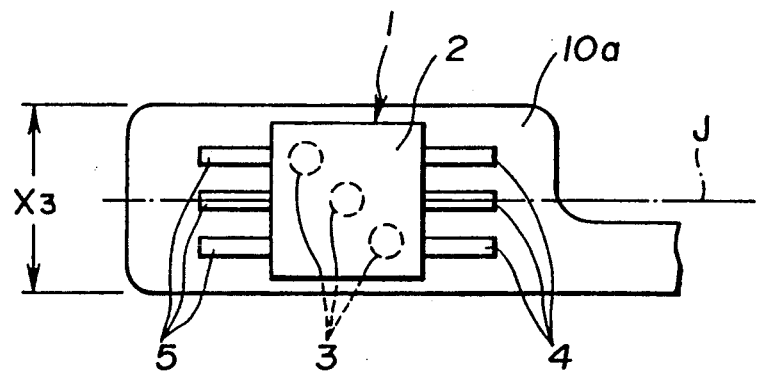
FIG. 2 is a diagram showing the light-emission device of the multipoint rangefinder of FIG. 1 as attached to a mounting substrate.
Figure 3:
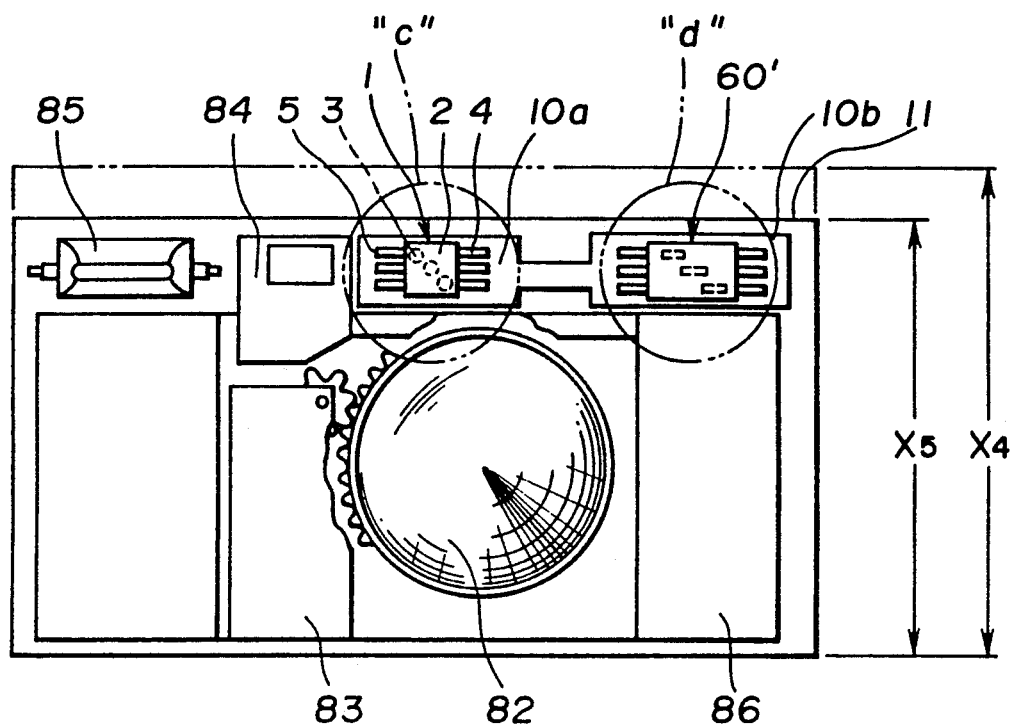
FIG. 3 is a front view showing how the multipoint rangefinder of FIG. 1 is mounted in a camera.
Figure 18:
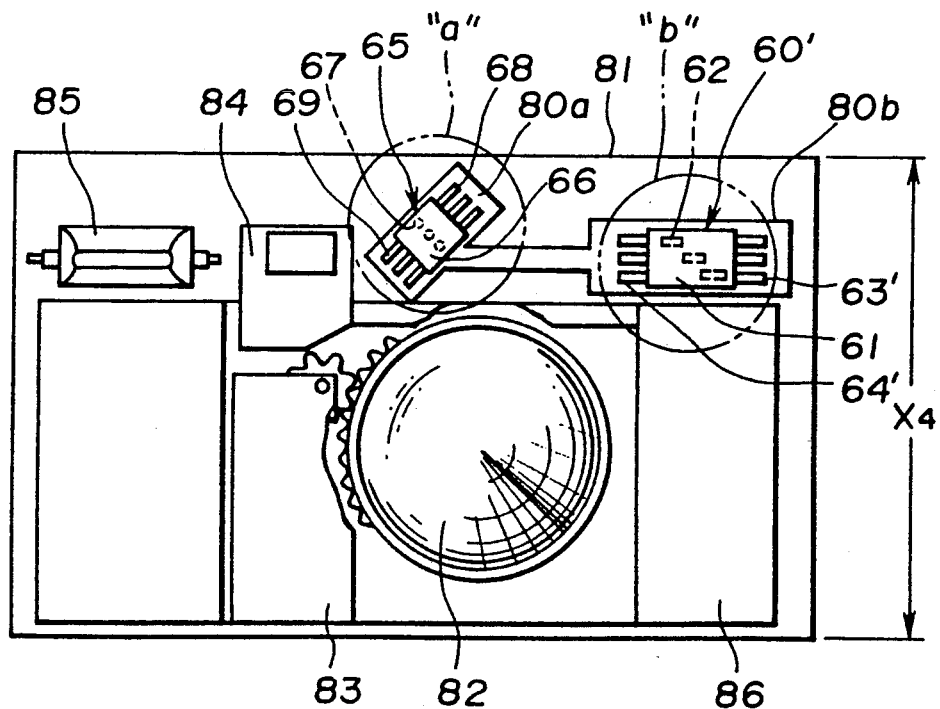
FIG. 18 is a front view showing how the multipoint rangefinder of FIGS. 14A, 14B is mounted in a camera.

FIG. 3 is a front view of a camera with its front housing section removed, showing the light-emission LED device 1 and the light-reception PSD device 60' of the multipoint rangefinder of this embodiment as installed in the camera together with other components. The light-emission LED device 1 and the light-reception PSD device 60' are arranged in the relative positional relationship shown in FIG. 1. The light-emission LED device 1 is attached to the mounting substrate 10a, as shown in FIG. 2 and, in this condition, mounted in the section "c" of the camera. The light-reception PSD device 60' is attached to a mounting substrate 10b and mounted in the section "d" of the camera. The camera components including the lens frame unit 82 are the same as those described with reference to the conventional example shown in FIG. 18.

In this camera, thus equipped with the multipoint rangefinder of this embodiment, constructed as described above, the vertical dimension the LED device 1 actually occupies in the camera is the width X3 of the mounting substrate 10a. As a result, the height X5 of the camera housing 11 is considerably reduced as compared to the height X4 of the conventional camera shown in FIG. 18.

Figure 4:
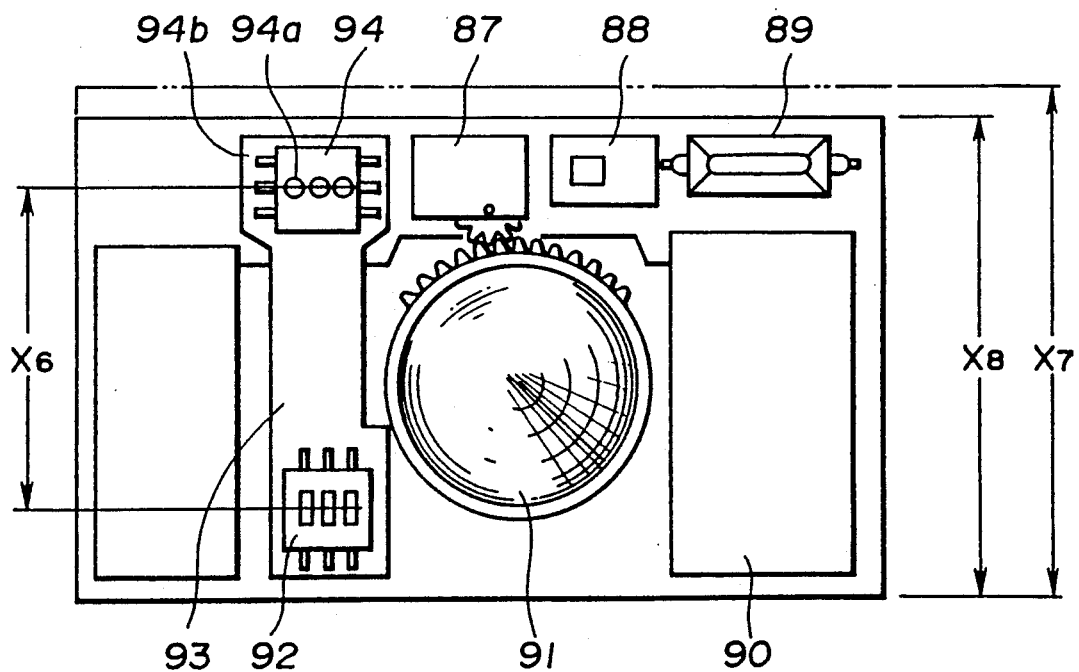
FIG. 4 is a front view showing how a multipoint rangefinder according to a second embodiment of the present invention is mounted in a camera.
Figure 14A:
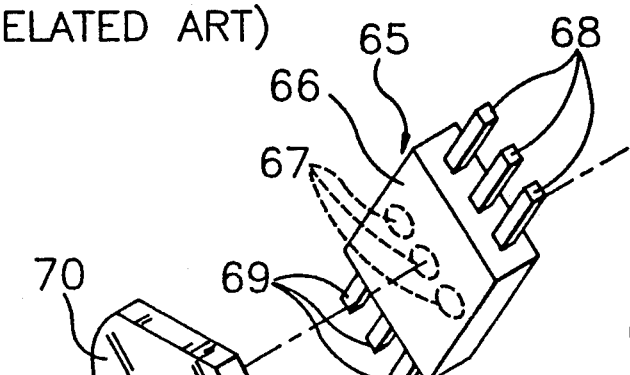
FIGS. 14A and 14B are perspective views of an arrangement of the light-emission element and light-reception element packages respectively of a conventional multipoint rangefinder using a triple PSD device as shown in FIG. 11 as the light-reception device.
Figure 14B:
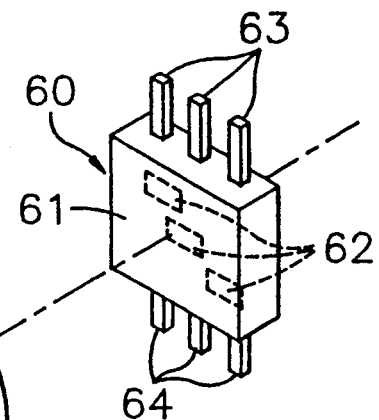
Figure 16:
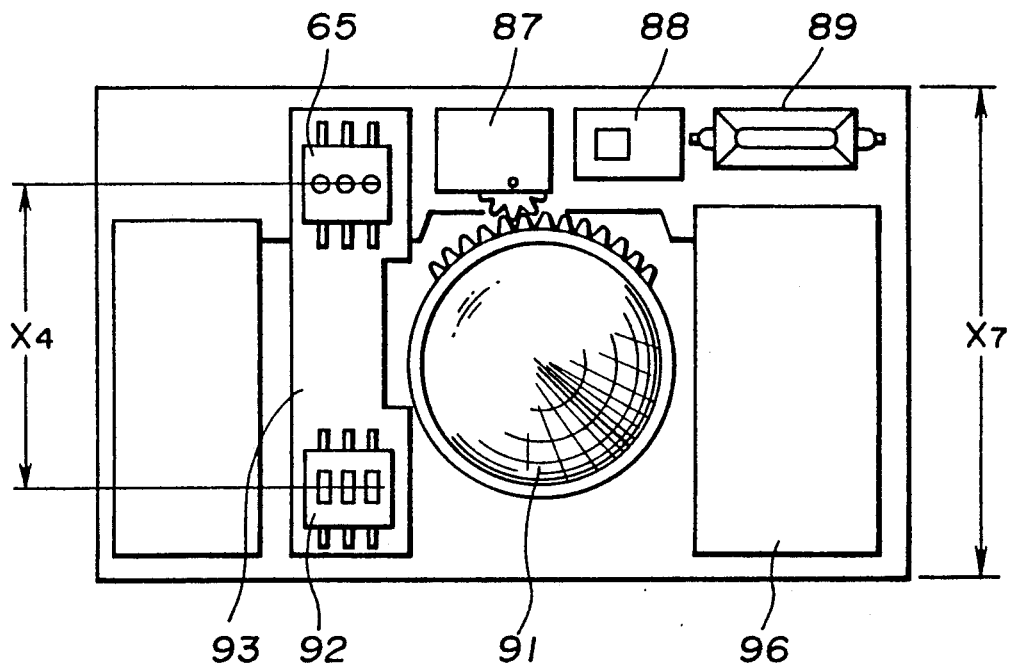
FIG. 16 is a front view showing how another conventional multipoint rangefinder is mounted in a camera.

FIG. 4 is a front view of a camera to which a multipoint rangefinder according to a second embodiment of the present invention is applied, showing the component arrangement inside the camera. As shown in the drawing, the component arrangement of this camera is the same as that of the conventional camera shown in FIG. 16 except for a mounting substrate 93, which constitutes the multipoint rangefinder of this embodiment. A light-emission package 94 is attached to the upper section of the mounting substrate 93, and a light-reception PSD package 92 containing light-reception elements is attached to the lower section of this substrate. The light-emission package 94 includes a plurality of light-emission LED elements 94a and mounting terminals 94b extending from this package, with the light-emission LED elements 94a being arranged in parallel with the dimension along which the mounting terminals 94b extend. Due to this arrangement of the light-emission package 94, the height X8 of this camera can be made smaller than the height X7 of the conventionally constructed camera shown in FIG. 16; the difference between them, (X7−X8), being derived from the length of the mounting terminals which extend vertically in the latter case.

What is claimed is:

1. A rangefinder for a camera which includes a light-emission block and a light-reception block which are spaced apart from each other by a predetermined base length, wherein said light-emission block includes a plurality of light-emission elements contained therein and mounting terminals extending therefrom, said mounting terminals extending in parallel with a dimension of a base length of an associated camera, said plurality of light-emission elements being arranged in a line crossing, at a predetermined angle, a dimension along which said mounting terminals extend, and wherein said light-reception block includes a plurality of position detecting elements contained therein and mounting terminals extending therefrom in parallel with the dimension of the base length of the associated camera, with a detection axis of said position detecting elements coinciding with the dimension along which said mounting terminals extend.

2. A camera including a plurality of light-emission elements adapted to emit light toward a subject and a plurality of semiconductor position detecting elements adapted to receive the light from said light-emission members after it has been reflected by the subject, said light-emission elements and said position detecting elements being spaced apart from each other by a predetermined distance along a dimension of a base length, said camera comprising:

a light-emission package including said plurality of light-emission elements and electric terminals of these light-emission elements, said plurality of light-emission elements being arranged in a line at a predetermined angle with respect to the dimension of said base length, said electric terminals being arranged substantially in parallel with the dimension of said base length; and a light-reception package including said plurality of semiconductor position detecting elements and electric terminals of these position detecting elements, said plurality of semiconductor position detecting elements being arranged along said line at said predetermined angle, with a detection axis of said position detecting elements being substantially parallel with the dimension of said base length, said electric terminals being arranged in parallel with the dimension of said base length.

3. A multipoint rangefinder comprising:

light-reception means including a first package having a plurality of light-reception elements and a plurality of mounting terminals, said light-reception elements being arranged obliquely with respect to a dimension along which said mounting terminals extend; and light-emission means including a second package having a plurality of light-emission elements and a plurality of mounting terminals, said light-emission elements being arranged obliquely with respect to the dimension along which said mounting terminals extend, said two packages being arranged in a lateral line the dimension of which coincides with the dimension along which said mounting terminals extend.

4. A light-emission-type multipoint rangefinder comprising:
   a light-emission device including a unitary package having a plurality of light-emission elements contained therein and mounting terminals extending therefrom, said plurality of light-emission elements being arranged in a line crossing a dimension along which said mounting terminals extend; and
   a detecting device for receiving light from said light-emission device which has been reflected by a subject to detect a distance to the subject.

5. A multipoint rangefinder according to claim 4, wherein an odd number of said light-emission elements are provided, one of which is arranged at a center of said package.

6. A light projecting device for cameras which projects light for detecting subject distance, said device comprising:
   a unitary package whose upper edge extends horizontally and whose side edges extend vertically;
   a plurality of light-emission elements arranged in an oblique line inside said unitary package; and
   a plurality of mounting terminals extending horizontally.

7. A light-emission-type multipoint rangefinder comprising:
   a light-emission device including a unitary package having a plurality of light-emission elements contained therein and mounting terminals extending therefrom, said plurality of light-emission elements being arranged in a line extending in parallel with a dimension along which said mounting terminals extend; and
   a detecting device which receives light from said light-emission device after it has been reflected by a subject to detect a distance to the subject.

8. A multipoint rangefinder comprising:
   light-reception means including a unitary rectangular substrate, a plurality of light-reception elements arranged on said rectangular substrate in such a way as to be oblique with respect to an arbitrary side of said rectangular substrate, and a plurality of mounting terminals extending from two opposite sides of said rectangular substrate; and
   light-emission means including a second unitary rectangular substrate, a plurality of light-emission elements arranged on said second rectangular substrate in such a way as to be oblique with respect to an arbitrary side of said rectangular substrate, and a plurality of mounting terminals extending from two opposite sides of said rectangular substrate,
   said light-reception means and said light-emission means being arranged in a line along a lateral dimension, which is in conformity with a dimension along which their mounting terminals extend.

9. A multipoint rangefinder according to claim 8, wherein each of said light-reception means and said light-emission means consists of a dual in-line package.

10. A rangefinder for a camera comprising:
    light-emission means and light-reception means arranged on said camera and spaced apart by a predetermined base length;
    said light-emission means including a plurality of light-emission elements mounted upon a substrate and having terminals extending from said substrate for electrical connection with associated circuitry;
    said terminals being arranged along sides of said substrate and being parallel to a base length line along which said base length is measured;
    said light emission elements being arranged to lie at spaced intervals along a diagonal line intersecting said base length line and forming an angle with said base length line;
    said light-reception means including a plurality of position detecting elements mounted upon a second substrate and a second plurality of electrical terminals extending from sides of said second substrate and being parallel to said base length line; and
    said position detection elements having a longitudinal detection axis parallel to the second plurality of electrical terminals.

11. A rangefinder for a camera according to claim 10 wherein said angle is less than a right angle.

12. A rangefinder for a camera according to claim 10 wherein said camera has a given width and a given height, the width being greater than the height thereof;
    said light-emission means and light-reception means being mounted on said camera so that said base line extends along the width of said camera and to one side of the taking lens.

13. A rangefinder for a camera comprising:
    light-emission means and light-reception means arranged on said camera and spaced apart by a predetermined base length;
    said light-emission means including a plurality of light-emission elements mounted upon a substrate and having terminals extending from said substrate for electrical connection with associated circuitry;
    said terminals being arranged along sides of said substrate and being transverse to a base length line along which said base length is measured;
    said light emission elements being arranged to lie at spaced intervals along a line intersection said base length line and substantially perpendicular to said base length line;
    said light-reception means including a plurality of position detecting elements mounted upon a second substrate and a second plurality of electrical terminals extending from sides of said second substrate and being parallel to said base length line; and
    said position detection elements having a longitudinal detection axis parallel to said base length line.

14. A rangefinder for a camera according to claim 13 wherein said camera has a given width and a given height, the width being greater than the height thereof;
    said light-emission means and light-reception means being mounted on said camera so that said base line extends along the height of said camera and to one side of the taking lens.

* * * * *

UNITED STATES PATENT AND TRADEMARK OFFICE
CERTIFICATE OF CORRECTION

PATENT NO. : 5,319,414
DATED : June 7, 1994
INVENTOR(S) : Toshifumi Nakano and Kazuhiro Satoh It is certified that error appears in the above-indentified patent and that said Letters Patent is hereby corrected as shown below:

Column 2, line 10, change "arrangement" to --arrangements--.

Column 5, line 7, change "FIG. 1" to --FIG. 2--.

Signed and Sealed this

Twenty-fifth Day of April, 1995

*Attest:*

BRUCE LEHMAN

*Attesting Officer*       *Commissioner of Patents and Trademarks*